United States Patent [19]
Ishikawa et al.

[11] Patent Number: 5,857,449
[45] Date of Patent: Jan. 12, 1999

[54] TWO-CYCLE INTERNAL COMBUSTION ENGINE

[75] Inventors: Takeshi Ishikawa; Naoki Tsuda, both of Tokyo, Japan

[73] Assignee: Kioritz Corporation, Tokyo, Japan

[21] Appl. No.: 950,614

[22] Filed: Oct. 15, 1997

[30] Foreign Application Priority Data

Oct. 16, 1996 [JP] Japan ................................. 8-273487

[51] Int. Cl.⁶ .............................. F02M 37/04; F02G 5/00
[52] U.S. Cl. ...................... 123/557; 123/65 R; 123/73 B
[58] Field of Search ................................. 123/557, 65 R, 123/73 A, 73 B, 73 C, 445

[56] References Cited

U.S. PATENT DOCUMENTS

| | | | |
|---|---|---|---|
| 3,868,939 | 3/1975 | Friese et al. | 123/557 |
| 3,999,525 | 12/1976 | Stumpp et al. | 123/557 |
| 4,665,881 | 5/1987 | Wade | 123/447 |
| 4,886,032 | 12/1989 | Asmus | 123/557 |
| 4,898,142 | 2/1990 | Van Wechem et al. | 123/557 |
| 5,050,569 | 9/1991 | Beunk et al. | 123/557 |
| 5,054,458 | 10/1991 | Wechem et al. | 123/557 |
| 5,095,879 | 3/1992 | Matsushima | 123/557 |
| 5,159,915 | 11/1992 | Saito et al. | 123/557 |
| 5,201,341 | 4/1993 | Saito et al. | 123/557 |

*Primary Examiner*—David A. Okonsky
*Attorney, Agent, or Firm*—Baker & Botts, L.L.P.

[57] ABSTRACT

A two-cycle internal combustion engine provided with at least one fuel injection nozzle, wherein the fuel injection nozzle is provided with a heating element for heating the fuel so as to cause the fuel to undergo a phase change before the fuel is injected from the fuel injection nozzle. A fuel control circuit for controlling the heating element is attached to the engine so that an AC electromotive force generated at a generator portion of an ignition device is input therein and, based on such electromotive force, the heating element is controlled. All of the ignition device, the fuel controlling circuit and the generator portion are formed into a single integrated body which functions as an ignition/fuel controlling device.

2 Claims, 2 Drawing Sheets

TWO-CYCLE INTERNAL COMBUSTION ENGINE

BACKGROUND OF THE INVENTION

1. Field of the Invention

This invention relates to a two-cycle internal combustion engine of the fuel injection type, and in particular to a two-cycle internal combustion engine of the fuel injection type which is relatively small in size and suited for use in a portable working machine such as a chain saw or a bush cutter.

2. The Prior Art

Because of the increasing concern in recent years of environmental problems, a reduction not only of the toxic substances in the exhaust gas but also of the engine noise is strongly demanded even in a small two-cycle internal combustion engine. In particular, there are pollution problems inherent to a two-cycle internal combustion engine, i.e. a problem of how to reduce the quantity of HC in the exhaust gas which is brought about due to a phenomenon of blow-by of unburnt air-fuel mixture from a combustion chamber, and a problem of how to prevent the discharge of unburnt fuel which is brought about due to a phenomenon of spitting of fuel toward the air-cleaner. These problems are also desired to be solved.

On the other hand, a lean burn engine, or a direct injection engine wherein fuel is directly injected into a combustion chamber has been recently proposed as a four-cycle internal combustion engine. In these types of engine, the reduction of toxic substances in the exhaust gas by means of a lean-burning technique is taken into consideration. Therefore, it is now studied how to apply this technique to a two-cycle internal combustion engine.

For example, a two-cycle internal combustion engine of the direct fuel injection type is proposed in U.S. Pat. No. 4,813,391. According to this technique, a fuel injection nozzle is disposed at a cylinder head portion of the combustion chamber so as to permit the injection of fuel to be effected directly into the combustion chamber. In this case, a fuel pump is actuated taking advantage of the fluctuation in pressure within a crank case, and, through this actuation of the fuel pump, fuel is fed to the fuel injection nozzle and then directly injected into the combustion chamber. The stroke of fuel injection, i.e. the injection of fuel from the injection nozzle, is performed as follows. Namely, as a piston is moved downward, the pressure inside a crank-case is proportionally increased, and when the piston is brought down to approximately the bottom dead center, the fuel pump is actuated by the pressure inside the crank-case, thus feeding fuel to the fuel injection nozzle, from which the fuel is injected by the pressing force of the fuel pump into the combustion chamber.

There is also known another example of a two-cycle internal combustion engine of the direct fuel injection type, wherein a fuel injection nozzle is disposed midway of an air passage (scavenging passage) communicating with a combustion chamber. Fuel from the injection nozzle is injected toward a heat conductive wall constituting a cylinder wall and impinged thereon so as to be gasified and mixed with air passing through the air passage, the resultant air-fuel mixture being fed to a combustion chamber (U.S. Pat. No. 4,876,999).

However, in the case of the former engine of the direct fuel injection type (U.S. Pat. No. 4,813,391), wherein the fuel injection nozzle is mounted on a cylinder body and fuel is directly injected from the fuel injection nozzle into the combustion chamber, the timing and manner of fuel injection are set such that the fuel pump is actuated depending on the pressure change inside the crank-case and the fuel is injected by the delivery pressure of the fuel pump, so that the timing of fuel injection as well as the quantity of fuel to be injected are rather difficult to adjust. At the same time, a fuel pump for injection of fuel as well as an operation system for actuating the fuel pump are required to be employed. Therefore, this fuel injection mechanism is not suited for the combustion control (air/fuel ratio control) of the engine and the structure thereof is rather complicated, thus raising a problem that the manufacturing cost thereof would be increased.

On the other hand, in the case of the injection system of a fuel injection nozzle which is commonly employed in a four-cycle internal combustion engine, fuel is compressed by means of a plunger pump and then fed to the fuel injection nozzle. An electrically operable member such as an electromagnetic solenoid is mounted on the fuel injection nozzle. On the occasion of fuel injection, the electrically operable member is magnetized to open or close the valve of the fuel injection nozzle.

In this fuel injection system, the timing of fuel injection is controlled electrically, thus making it possible to inject fuel at an appropriate timing and to adjust the quantity of fuel. However, it is required according to this system to provide the fuel injection nozzle with an electrically operable member and a nozzle shut-off valve, and at the same time to install a control device for controlling the fuel injection nozzle. These devices which are required in the manufacture of the fuel injection type engine as mentioned above are rather expensive, so that the application of the fuel injection nozzle of this system to a two-cycle internal combustion engine for a bush cutter, etc. is not suitable in terms of cost.

SUMMARY OF THE INVENTION

The present invention has been made under the circumstances mentioned above. It is therefore an object of the present invention to provide a two-cycle internal combustion engine having a fuel injection nozzle of low cost and with a controlling device for controlling the fuel injection nozzle, wherein the injection timing of fuel as well as the quantity of fuel can be easily adjusted.

According to the present invention, there is provided a two-cycle internal combustion engine of the fuel injection type provided with a plurality of fuel injection nozzles, wherein each of said fuel injection nozzles is provided with a heating element for heating the fuel so as to cause the fuel to undergo a phase change before the fuel is injected from the fuel injection nozzle.

According to the present invention, there is further provided a two-cycle internal combustion engine of the fuel injection type, which is provided with a fuel controlling circuit as means for controlling the aforementioned heating element; the fuel controlling circuit being designed such that an AC electromotive force generated at a generator portion of an ignition device can be input thereto and, based on this electromotive force, the heating element can be controlled; and all of the ignition device, the fuel controlling circuit and the generator portion being formed into a single integrated body to function as an ignition/fuel controlling device.

When a two-cycle internal combustion engine of the fuel injection type constructed as mentioned above according to the invention is assumed to be formed of a Schnurle type crank chamber pre-compression and piston valve system, the engine will operate as follows. Namely, when the piston moves upward to start the discharge of combustion exhaust gas from the combustion chamber, the scavenging port is opened to allow the pre-compressed intake air in the crank chamber to flow via the scavenging passage into the combustion chamber so as to discharge any residual combustion exhaust gas from the combustion chamber, thereby scavenging the combustion chamber.

While the cylinder chamber is being scavenged, the piston starts to move upward to ultimately close the scavenging port. At a suitable timing before the scavenging port is completely closed, a signal is emitted from the ignition/fuel controlling device to instantaneously heat the heating element of the fuel injection nozzle with a high voltage. When the heating element is heated in this manner, the fuel that has been fed to the nozzle is instantaneously heated to undergo a phase change so as to generate bubbles. Simultaneously with the growth of the bubbles, the inner pressure in the end portion of the nozzle is increased so that the fuel is forced to be injected from the distal end of the nozzle into the combustion chamber and mixed with air. After this injection of fuel, the piston is further moved upward to enter into a compression stroke. When the piston is further advanced to reach near the top dead center, a signal is emitted from the ignition/fuel controlling device to cause the spark plug to spark, thereby causing the air-fuel mixture to be explosively burnt.

In the expansion stoke following the explosion of the air-fuel mixture, the piston is moved downward to pre-compress the air that has been sucked in the crank chamber, thus making it ready to repeat a sequence of the strokes as mentioned above.

Since the two-cycle internal combustion engine according to this invention is designed such that fuel is instantaneously heated by a heating element of a fuel injection nozzle before the fuel is injected, there is no need to employ a special fuel compression pump or a shut-off valve, so that the construction of the fuel injection nozzle can be simplified. Furthermore, since the two-cycle internal combustion engine according to this invention is provided with a plurality of the fuel injection nozzles, each provided with a heating element as mentioned above, the quantity of fuel to be injected in a single injection can be easily altered.

Moreover, since the injection of fuel is performed by a plurality of injection nozzles and, at the same time, the quantity of fuel can be adjusted by a plurality of injection nozzles, it is possible to accurately and easily to control the air/fuel ratio of lean burn combustion, for instance.

Furthermore, since the heat control of the heating element can be effected by taking advantage of an AC electromotive force of the generator means of the ignition device, it is possible to simplify the structure of the fuel injection control device. Additionally, since all of the ignition device, the generator means and the fuel controlling circuit are integrated into a single body as an ignition/fuel controlling device and are placed near the fan rotor for air-cooling, the overall dimension of the ignition/fuel controlling device can be made compact.

DETAILED DESCRIPTION OF THE INVENTION

The invention will be further explained with reference to the drawings depicting one embodiment of a two-cycle internal combustion engine according to this invention.

Figure 1:
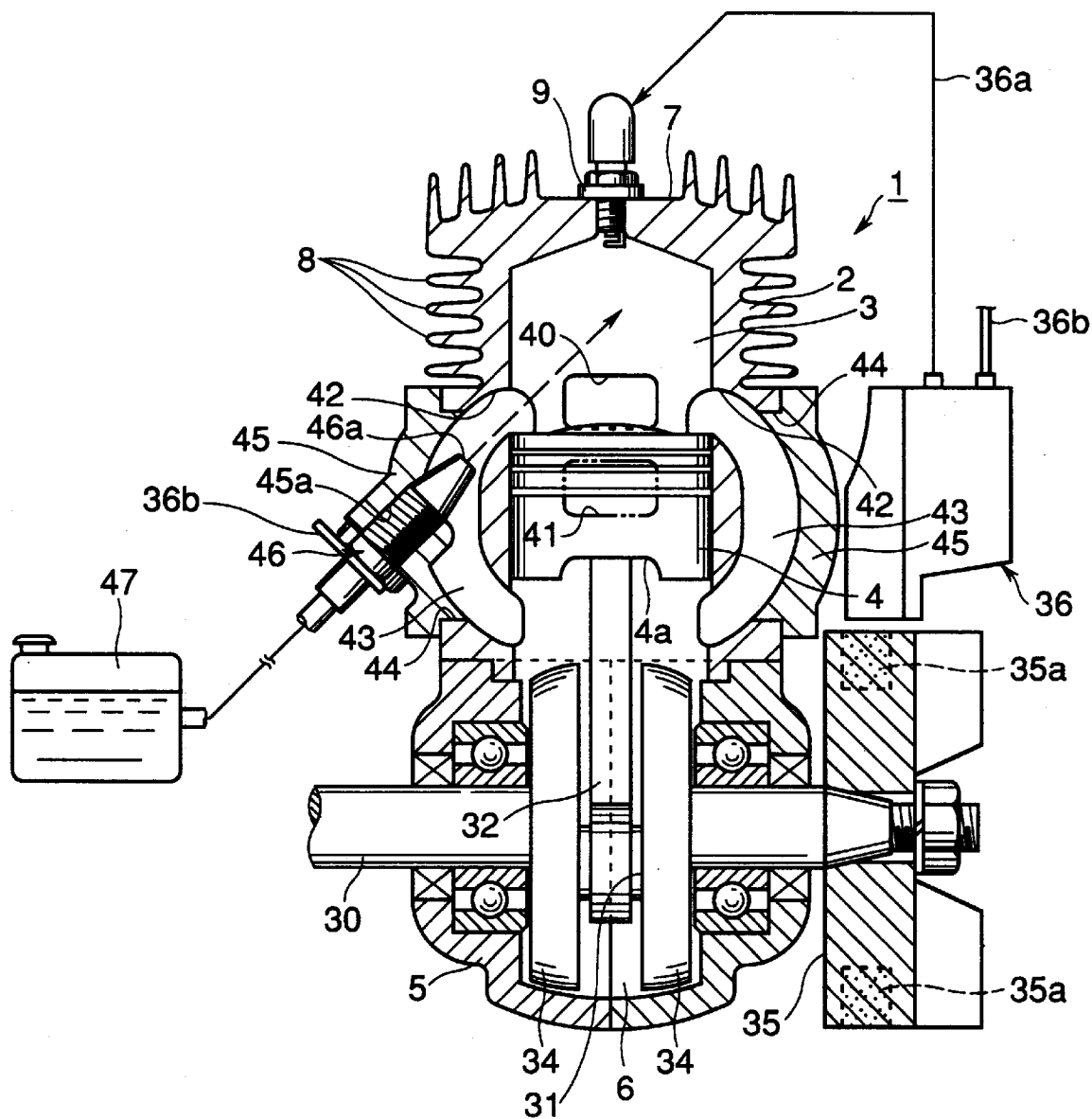
FIG. 1 is a longitudinal sectional view illustrating one embodiment of a two-cycle internal combustion engine according to this invention.

In the embodiment illustrated in FIG. 1, a fuel injection type, two-cycle internal combustion engine 1 (hereinafter referred to simply as an internal combustion engine) constructed in accordance with the invention comprises a so-called Schnurle type crank chamber pre-compression system two-cycle internal combustion engine. It includes a cylinder block 2 having a combustion chamber 3 in which a piston 4 is adapted to be slidingly moved up and down, a split type crankcase 5 attached to the lower end portion of the cylinder block 2 and provided therein with a crank chamber 6, a cylinder head 7 which is formed integrally with the upper portion of the cylinder block 2, a plurality of cooling fins 8 for air-cooling formed on the outer periphery of the cylinder block 2, and a spark plug 9 attached to a suitable portion of the cylinder head 7 and connected via a high voltage cable 36a to an ignition device 37 to be explained hereinafter.

The crank chamber 6 is cylindrical in shape, short in height and hermetically closed. A crank shaft 30 is axially held at a central portion of each of the right and left sides of the crank chamber 6. The piston 4 is connected via a connecting rod 32 to a crank pin 31 of the crank shaft 30. A pair of sector shaped crank webs 34 are fixed at the right and left ends of the crank pin 31 so that the connecting rod 32 is interposed between the pair of sector shaped crank webs 34. Consequently, the crank webs 34 are designed to be rotated integral with the crank shaft 30.

A fan rotor 35 for air-cooling is fixed to one end portion of the crank shaft 30. A plurality of magnets 35a are embedded in the outer peripheral wall of the fan rotor 35. An ignition/fuel controlling device 36 (to be explained in detail hereinafter) is disposed to face the outer peripheral wall of the fan rotor 35, thereby allowing the output power of the ignition/fuel controlling device 36 to be supplied to the spark plug 9 and to a fuel injection nozzle 46 (to be explained in detail hereinafter).

The cylinder block 2 is provided with an exhaust port 40 which opens at a portion of the inner wall of the combustion chamber 3 that is directed to intersect at a right angle with the axis of the crank shaft 30. The cylinder block 2 is also provided with a suction port 41 which opens at a portion of the inner wall of the combustion chamber 3 that approximately faces the exhaust port 40 (a portion which is dislocated by an angle of 180) but is located at somewhat lower level than where the exhaust port 40 is located. Furthermore, a pair of scavenging ports 42 are formed in the cylinder block 2 to face each other at portions of inner wall of the cylinder block 2 that are located at an intermediate portion between the exhaust port 40 and the suction port 41, i.e. each port 42 is dislocated by an angle of 90 from the exhaust port 40 and the suction port 41 (right and left sides in FIG. 1). These scavenging ports 42 are formed respectively on the top of each of so-called wall type scavenging passages 43, each of which extends from the scavenging ports 42 toward the lower portion of the cylinder block 2 so as to communicate with the crank chamber 6.

In order to facilitate the monoblock casting of the cylinder block 2 and cylinder head 7 by means of a high pressure die casting, a pair of openings-for-casting 44 are formed respectively along the scavenging passages 43, thereby allowing the outer side of each scavenging passage 43 to communicate with the outer atmosphere. Accordingly, a pair of scavenging passage covers 45, each having a smoothly curved inner surface in conformity with the scavenging passage 43 and prepared separately from the cylinder block 2, is attached to the openings-for-casting 44, respectively. When the scavenging passage covers 45 are fixed to the openings-for-casting 44 respectively by making use of an adhesive for instance, the openings-for-casting 44 are closed, thereby completing smoothly curved passages so as to allow scavenging air to pass therethrough, thus exhibiting an efficient scavenging.

One (the one on the left side in FIG. 1) of the scavenging passage covers 45 is provided with an internally threaded through-hole 45a, in which a fuel injection nozzle 46 having an external thread on its outer peripheral wall is inserted or screwed. The distal end 46a of the fuel injection nozzle 46 is directed toward the top of the combustion chamber 3, so that when the fuel is injected, it is fed to a region inside the combustion chamber 3 that is optimum for the combustion of the fuel.

Figure 2:
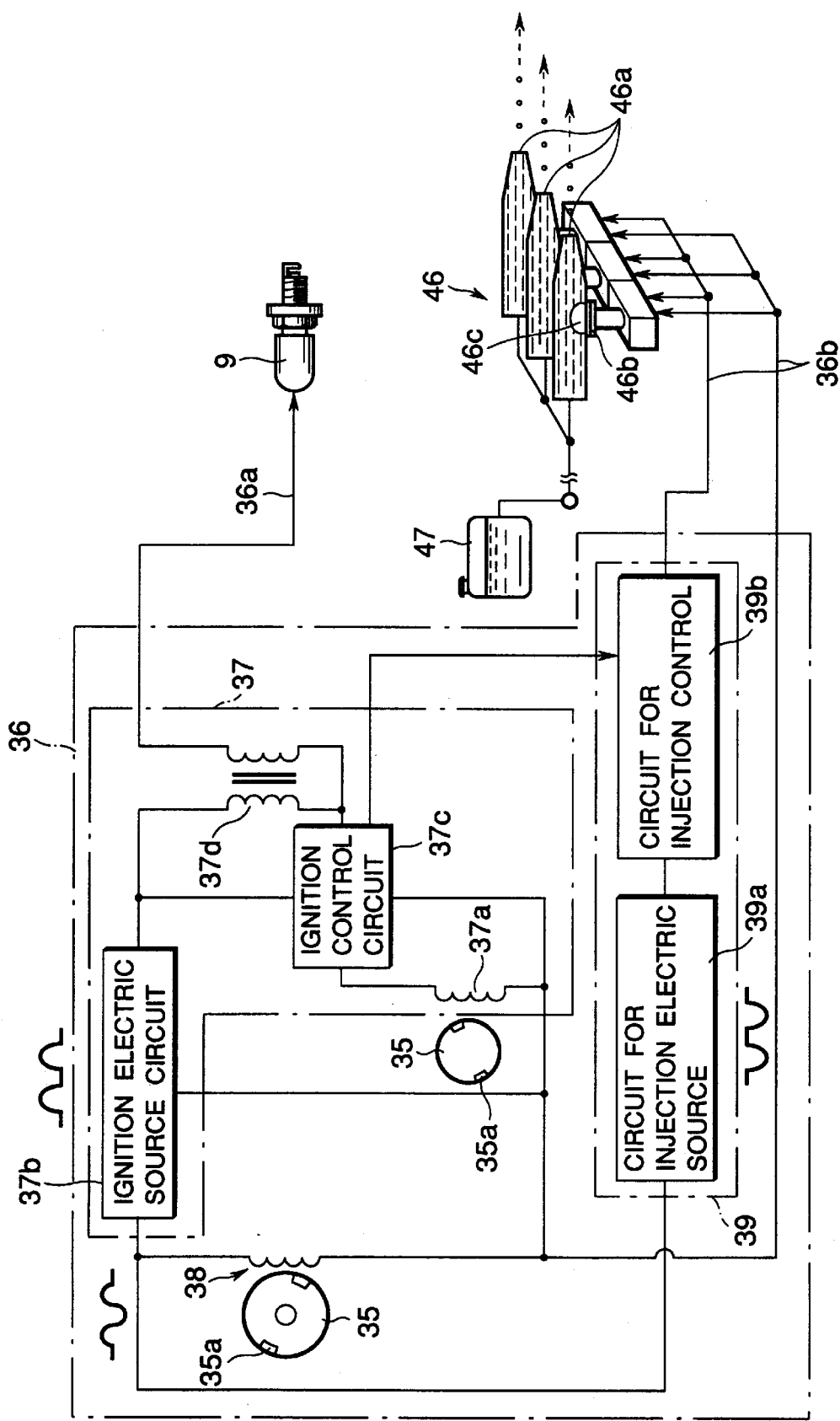
FIG. 2 is a block diagram illustrating the system and wiring of the ignition/fuel controlling device of the two-cycle internal combustion engine shown in FIG. 1.

FIG. 2 shows a block diagram illustrating the relationship between the ignition/fuel controlling device 36 and the spark plug 9 or the fuel injection nozzle 46, which are to be actuated by the ignition/fuel controlling device 36.

The ignition/fuel controlling device 36 comprises an AC generating means 38 and a fuel control circuit 39 which are integrally incorporated into the ignition/fuel controlling device 36 in addition to an ignition device 37 of an ordinary CDI or TCI system. The AC generating means 38 is adapted to generate electricity through the rotation of the fan rotor 35 and to feed the electricity thus generated to the ignition device 37 and the fuel control circuit 39, so as to actuate the spark plug 9 and the fuel injection nozzle 46.

The ignition device 37 is of the ordinary type and comprises a pick-up coil 37a for controlling the timing of ignition, an ignition electric source circuit 37b for performing a half-wave rectification of AC current supplied from the AC generating means 38, an ignition-controlling circuit 37c and an ignition coil 37d. The fuel control circuit 39 is constituted by an injection electric source circuit 39a for performing a half-wave rectification (opposite in phase to the ignition electric source circuit 37b) of AC current, and an injection control circuit 39b. The ignition device 37 is connected via the high voltage cable 36a to the spark plug 9, while the fuel control circuit 39 is connected via wirings 36b to the fuel injection nozzle 46.

The fuel injection nozzle 46 is connected to a fuel tank 47, so that the fuel from the fuel tank 47 is fed to the position of the fuel injection nozzle 46 (because the fuel tank 47 is generally disposed lower than the fuel injection nozzle 46) by means of a priming pump (at the occasion of start-up) or a lift pump (during operation), both of which (not shown) are of the ordinary type employed usually in a two-cycle internal combustion engine (air-fuel mixture suction).

The fuel injection nozzle 46 is provided with a heating element 46b formed of an electric heater, etc., which is connected to the fuel control circuit 39. The heating element 46b is adapted to be instantaneously heated by power of high voltage which is supplied from the fuel control circuit 39. When the heating element 46b is heated in this manner, the fuel which has been fed to the nozzle 46 is instantaneously heated to undergo a phase change so as to generate bubbles 46c. Simultaneously with the growth of the bubbles 46c, the inner pressure of the nozzle 46 is increased, so that the fuel is caused to be injected from the opening of the distal end portion 46a of the nozzle 46 into the combustion chamber 3.

Since the cylinder block 2 is provided with a plurality of the injection nozzles 46, each having a heating element 46b, the quantity of fuel to be injected can be adjusted by individually controlling the heating elements 46b. It is also possible to set a porous body such as a ceramic porous body in the interior of the nozzle 46 so as to allow the fuel to be soaked into the porous body and then be heated by the heating element 46b.

The ignition action of the ignition device 37 is effected by taking advantage of an AC electromotive force which is generated at the AC generating means 38. The electromotive force which is actually utilized in this ignition action is either a positive half-wave voltage, or a negative half-wave voltage so that the other half-wave voltage is not utilized at all. In this embodiment, the half-wave voltage that is not utilized in the ignition action is utilized for actuating the fuel injection nozzle 46.

Specifically, the AC generating means 38 is designed to generate an AC electromotive force through the rotation of the fan rotor 35. Ignition is effected by the voltage of the positive side (or the negative side) at the moment when AC voltage is changed from the positive side (or the negative side) to the negative side. The fuel injection nozzle 46 is designed to utilize a voltage of the opposite side of this AC electromotive force, i.e. a voltage of the negative side (or the positive side) as explained below. Namely, the output signal of the AC electromotive force is taken out of the ignition control circuit 37c and transmitted to the injection control circuit 39b, which is then actuated to cause the heating element 46b of the fuel injection nozzle 46 to be instantaneously heated through an application of high voltage by taking advantage of the voltage which is opposite to that employed in the ignition device 37, i.e. the voltage of negative (or the positive) side, thereby heating and injecting the fuel therefrom. Specifically, the AC power generated at the AC generating means 38 is rectified by the injection electric source circuit 39a into a DC power, which is then supplied to the fuel control circuit 39. The injection control circuit 39b is designed to receive an output signal (timing signal) of the AC electromotive force from the ignition control circuit 37c. Based on this output signal, an electric power is transmitted through the wiring 36b to the heating elements 46b so as to instantaneously heat the heating elements 46b by the application of a high voltage. The fuel heated by the heating elements 46b is then injected from the end portion 46a of the fuel injection nozzle 46 in conformity with the timing of the scavenging stroke of the internal combustion engine 1. The adjustment in the quantity of fuel injected can be controlled by suitably selecting the heating element 46b attached respectively to each end portion 46a of the nozzle 46 by making use of the injection control circuit 39b.

Next, the operation of the aforementioned internal combustion engine 1 according to this embodiment will be explained as follows.

The internal combustion engine 1 according to this embodiment is of a so-called piston valve system, wherein neither a suction valve nor an exhaust valve is provided, and the suction port 41 and the exhaust port 40 are alternatively allowed to communicate respectively with the crank chamber 6 and with the combustion chamber 3 by the reciprocating movement (up and down movement) of the piston 4, thereby performing the suction and exhaust action of the engine 1 in the same manner as the aforementioned suction valve and exhaust valve.

In the operating condition of the internal combustion engine 1 where the piston 4 moves up and down, when the piston 4 moves down to come close to the bottom dead center, the exhaust port 40 is opened at first thereby allowing the combustion exhaust gas to be discharged from the interior of the combustion chamber 3 to the outside of the internal combustion engine 1. Then, the scavenging ports 42 are opened to allow the air sucked and pre-compressed in the crank chamber 6 to flow via the scavenging passages 43 into the combustion chamber 3, thereby purging any residual combustion exhaust gas out of the combustion chamber 3 through the exhaust port 40, thus scavenging the combustion chamber 3. A little amount of the sucked air is also discharged through the exhaust port 40.

During this scavenging operation, the piston 4 starts to move upward to close the scavenging port 42 again. However, at a suitable timing immediately before the scavenging port 42 is closed, the heating element 46b of the fuel injection nozzle 46 is instantaneously heated in accordance with an output signal from the control circuit 39b of the ignition/fuel controlling device 36, thereby allowing the fuel to be injected directly into the combustion chamber 3 from the distal end 46a of the fuel injection nozzle 46 and mixed with the air sucked in the combustion chamber 3. After the injection of fuel, the piston 4 is further moved upward to close the scavenging ports 42 at first and then to enter into the compression stroke while closing the exhaust port 40. When the piston 4 is further advanced to reach near the top dead center, a power of high voltage is supplied via the high voltage cable 36a to the spark plug 9 from the ignition device 37 of the ignition/fuel controlling device 36 thereby to cause the spark plug 9 to spark and the air-fuel mixture to be explosively burnt.

As explained above, when the piston 4 is in the compression stroke, the pressure in the crank chamber 6 is gradually decreased with the ascending movement of the piston 4, so that when the skirt portion 4a of the piston 4 moves up past the suction port 41, thus allowing the suction port 41 to be communicated with the crank chamber 6, the ambient air is sucked into the crank chamber 6 through an air cleaner (not shown).

In the expansion stoke following the explosion of the air-fuel mixture, when the piston 4 moves downward to close the suction port 41, the air that has been sucked in the crank chamber 6 is pre-compressed, and then the scavenging ports 42 are opened to allow the crank chamber 6 to communicate with the combustion chamber 3. As a result, the air that has been sucked and pre-compressed in the crank chamber 6 is forced to enter via the scavenging passages 43 into the combustion chamber 3 from the scavenging ports 42, thus making it ready to repeat a sequence of the strokes as mentioned above.

Since the two-cycle internal combustion engine 1 according to this embodiment is designed such that the fuel injection nozzle 46 provided with the heating element 46b is disposed in the scavenging passage 43, so as to instantaneously heat the fuel by the heating element 46b before the fuel is injected, there is no need to employ an expensive special fuel compression pump or a shut-off valve, so that the construction of the fuel injection nozzle 46 can be simplified. Furthermore, since the two-cycle internal combustion engine 1 according to this embodiment is provided with a plurality of fuel injection nozzles 46, each provided heating element 46b as mentioned above, the quantity of fuel to be injected in a single injection can be easily controlled.

Moreover, since the injection of fuel is performed by a plurality of injection nozzles 46 and, at the same time, the quantity of fuel can be adjusted by a plurality of injection nozzles 46, it is possible to accurately and easily to control the air/fuel ratio of lean burn combustion for instance.

Further, since the heat control timing of the heating elements 46b is designed to take advantage of the ignition signal from the ignition control circuit 37c, the device 39 for controlling the injection of fuel can be made simple in structure.

Furthermore, since all of the ignition device 37, the generator means 38 and the fuel controlling circuit 39 are integrated into a single body as an ignition/fuel controlling device 36 and are placed near the fan rotor 35 for air-cooling, the overall dimension of the ignition/fuel controlling device 36 can be made compact. At the same time, it has become possible to control both ignition and fuel injection by making use of only the ignition/fuel controlling device 36.

Since the ignition/fuel controlling device 36 is formed into an integral body, the wiring and assembling work can be easily performed in the same manner as in the case of the conventional ignition device, and the repair of the device can be easily performed. Furthermore, the number of parts for the ignition/fuel controlling device 36 can be minimized.

In the foregoing explanation, the present invention has been explained with reference to one embodiment. However, the present invention should not be construed to be limited to this embodiment, but may be variously modified within the spirit of the invention as set out in the claims.

As explained above, since the two-cycle internal combustion engine according to the invention is constructed such that fuel is injected through the heating of the fuel injection nozzle, and since the heating timing is determined by making use of the ignition timing signal from the existing ignition device, it is possible to provide a two cycle internal combustion engine of fuel injection type which is simple in structure.

Moreover, as all of the ignition control device and the fuel injection control device are integrated into a single body, the overall dimension of the device can be made compact. Also, the workability, such as assembling and repair, of the device can be improved and, at the same time, the overall weight and manufacturing cost of the device can be minimized.

We claim:

1. A two-cycle internal combustion engine comprising:

a plurality of fuel injection nozzles;

a heating element coupled to each of said fuel injection nozzles for heating the fuel so as to cause the fuel to undergo a phase change before the fuel is injected from each of said fuel injection nozzles; and a fuel controlling circuit for controlling said heating element coupled to each of said fuel injection nozzles, said fuel controlling circuit being operative to permit an AC electromotive force which is generated at a generator portion of an ignition device for said engine to be input therein and, based on said electromotive force, to control each of said heating elements.

2. The two-cycle internal combustion engine according to claim 1, wherein all of said ignition device, said fuel controlling circuit and said generator portion are formed as a single integrated body operable as an ignition/fuel controlling device.

* * * * *